United States Patent [19]

Herbon et al.

[11] Patent Number: 5,782,258
[45] Date of Patent: Jul. 21, 1998

[54] VAPOR RECOVERY FUEL TANK SYSTEM

[75] Inventors: Joseph A. Herbon, Rochester Hills; Eric A. Mihal, Farmington Hills; Karen R. Byrka, West Bloomfield, all of Mich.; Scott C. Gaynor, Greenville, S.C.; Frederic Ramioulle, Choisy Au Bac, France

[73] Assignees: Alfmeier Corporation, Greenville, S.C.; Solvay Automotive, Inc., Troy, MI

[21] Appl. No.: 570,186

[22] Filed: Dec. 11, 1995

[51] Int. Cl.$^6$ ................................. F16K 24/04
[52] U.S. Cl. ..................... 137/43; 137/202; 137/587
[58] Field of Search ..................... 137/43, 202, 587; 144/326

[56] References Cited

U.S. PATENT DOCUMENTS

| | | |
|---|---|---|
| 3,385,468 | 5/1968 | Fleming et al. . |
| 3,765,435 | 10/1973 | Schlanzky . |
| 3,805,818 | 4/1974 | Yamada . |
| 4,122,968 | 10/1978 | Germain . |
| 4,382,449 | 5/1983 | Nelson . |
| 4,413,804 | 11/1983 | Lanius et al. . |
| 4,625,777 | 12/1986 | Schmidt . |
| 4,679,581 | 7/1987 | Mears . |
| 4,685,584 | 8/1987 | Harris . |
| 4,694,870 | 9/1987 | Vize . |
| 4,702,268 | 10/1987 | Ambruster et al. ............... 137/202 |
| 4,714,172 | 12/1987 | Morris . |
| 4,739,808 | 4/1988 | Schmidt . |
| 4,753,262 | 6/1988 | Bergsma . |
| 4,779,637 | 10/1988 | Ubaldi . |
| 4,809,863 | 3/1989 | Woodcock et al. . |
| 4,816,045 | 3/1989 | Szlaga et al. . |
| 4,844,113 | 7/1989 | Jones . |
| 4,846,135 | 7/1989 | Tiphaine . |
| 4,869,283 | 9/1989 | Oeffling et al. ............... 137/43 |
| 4,887,578 | 12/1989 | Woodcock et al. . |
| 4,889,150 | 12/1989 | Lloyd et al. . |
| 4,905,726 | 3/1990 | Kasugai et al. . |
| 4,917,157 | 4/1990 | Gifford et al. . |
| 4,966,299 | 10/1990 | Teets et al. . |

(List continued on next page.)

FOREIGN PATENT DOCUMENTS

| | | |
|---|---|---|
| 2636573 | 12/1990 | France . |
| 2658453 | 6/1992 | France . |
| 3709925C1 | 5/1988 | Germany . |
| 4121324A1 | 1/1993 | Germany . |
| 4344837A1 | 7/1994 | Germany . |
| 4304649A1 | 9/1994 | Germany . |

OTHER PUBLICATIONS

Abstract, French Patent No. 2 636 573.
Abstract, German Patent No. De 43 04 649 A1.
Abstract, French Patent No. 2 658 453.
Abstract, German Patent No. DE 41 21 324 A1.
Abstract, German Patent No. DE 43 44 837 A1.
Abstract, German Patent No. DE 37 09 925 C1.

*Primary Examiner*—Gerald A. Michalsky
*Attorney, Agent, or Firm*—Dority & Manning, P.A.

[57] ABSTRACT

A vapor recovery fuel system includes a fuel tank having at least one vent opening defined therein. A fuel vapor canister is in communication with the vent opening to receive and filter fuel vapors from the tank. A refueling control valve is configured in the vent opening and has a first inlet orifice and an outlet in communication with the vapor trap. The control valve includes a variably buoyant first float body extending into an interior of the fuel tank which rises over a predetermined range of movement in response to increasing fuel level. The control valve includes a second float body engaged by the first float body over at least a portion of its range of movement. The first float body has a buoyancy during refueling so as to rise with increasing fuel level to engage and move the second float body into a sealing position to seal the inlet orifice from the outlet at a predetermined height of fuel within the tank. The first float body has a buoyancy reducing mechanism for automatically reducing its buoyancy after refueling so that it lowers in the fuel tank thereby allowing the second buoyant body to lower and unseal the inlet orifice after refueling.

37 Claims, 5 Drawing Sheets

U.S. PATENT DOCUMENTS

| | | | |
|---|---|---|---|
| 4,991,615 | 2/1991 | Szlaga et al. | 137/202 X |
| 5,054,508 | 10/1991 | Benjey | 137/43 |
| 5,071,018 | 12/1991 | Moore . | |
| 5,183,087 | 2/1993 | Aubel et al. . | |
| 5,215,132 | 6/1993 | Kobayashi . | |
| 5,234,013 | 8/1993 | Roetker et al. . | |
| 5,234,022 | 8/1993 | Harris . | |
| 5,247,958 | 9/1993 | Deparis et al. . | |
| 5,263,511 | 11/1993 | Ohasi et al. | 251/65 X |
| 5,318,069 | 6/1994 | Harris . | |
| 5,417,240 | 5/1995 | Benjey . | |

5,782,258

1

VAPOR RECOVERY FUEL TANK SYSTEM

BACKGROUND OF THE INVENTION

The present invention relates to a fuel tank system and, in particular, to an onboard refueling vapor recovery system.

During refueling of fuel tanks with liquid fuel, particularly automobile fuel systems, fuel vapor or hydrocarbon gases above the liquid fuel in the tank interior typically escape into the atmosphere through displacement of the fuel vapor as the fuel tank is being filled. Regulatory agencies, such as the Environmental Protection Agency, have promulgated increasingly stringent regulatory requirements for hydrocarbon emissions during refueling. As a consequence, fuel tank systems have undergone major changes in an effort to regulate and control venting of fuel tank vapors during refueling.

In an attempt to meet regulatory requirements, various configurations of On Board Vapor Recovery (ORVR) Systems have been developed over the last few years. Conventional configurations of such systems have included an outlet port or vent opening in the tank with associated valving and hardware for allowing fuel vapors to escape from the fuel tank during refueling to a vapor trap (such as a charcoal canister) for adsorbing hydrocarbons from the fuel tank vapors. Some known configurations are further augmented by a rollover valve that prevents fuel spillage through the outlet port in the event that a vehicle containing the fuel tank tips or rolls over. It is known to configure the rollover valve with a refueling valve in a combination rollover/refueling valve.

Examples of conventional onboard refueling vapor recovery systems can be found in U.S. Pat. No. 5,183,087; U.S. Pat. No. 4,809,863; U.S. Pat. No. 5,054,508; U.S. Pat. No. 5,318,069; and U.S. Pat. No. 5,234,022.

ORVR Systems can also be classified as restricted systems and unrestricted systems. In unrestricted systems, a relatively large refueling valve is used to continuously vent vapors out of the fuel tank through an outlet port and into a vapor trap during both refueling and normal vehicle operations. In restricted systems, a control valve is used to close or reduce the opening of the outlet port of the refueling valve during normal or non-refueling operation. In both systems, a mechanism is provided to protect the vapor trap or canister from an over filling condition.

Conventional ORVR Systems also operate with two different types of seal systems in the filler pipe area. In mechanical systems, a mechanical seal is generally provided in the filler pipe to form a seal with a refueling nozzle so that fuel vapors cannot escape through the filler pipe into the atmosphere during refueling. In a liquid seal system, a generally smaller diameter filler pipe is used to provide a liquid seal with the fuel between the vapor contained in the fuel tank and the atmosphere.

Diaphragm controlled refueling valves are also well known in the art, for example such as illustrated in U.S. Pat. No. 5,054,508. With this device the diaphragm control element within the valve pulls an internal valve plate against a seat when the filler pipe cap is removed to close off the vent between the fuel tank and the canister during refueling operations. In other diaphragm controlled systems, diaphragms are used to open or close one or several ports in response to pressure differentials between the vapor in the fuel tank and vapor at the top of the filler pipe which triggers the control valve to open or close. Diaphragm controlled valves, however, are unreliable, unstable, and cannot be precisely controlled because pressure differentials are unpredictable and the mechanisms that sense pressure differentials typically use vent lines between the fuel tank and the filler head that sometimes become obstructed or clogged.

In general, the conventional systems are fairly mechanically sophisticated and require a relatively large number of parts and connections, such as vent ports, vent lines, complicated mechanical valves, and the like. The conventional refueling control valves are also not particularly well suited for changeout or placement in alternate types of systems. For example, a conventional diaphragm or float controlled refueling valve used in a restricted system cannot be readily placed into an unrestricted system. Additionally, many of the conventional refueling valves also depend on the type of sealing mechanism used between the nozzle and filler pipe.

OBJECTS AND SUMMARY OF THE INVENTION

It is a principal object of the present invention to provide an improved refueling control valve which can be readily adapted to various types of ORVR Systems.

Another object of the present invention is to provide an ORVR System which is mechanically simple, adaptable to various ORVR configurations, and relatively inexpensive to manufacture.

Still another object of the present invention is to provide a refueling control valve which is easily adaptable to restricted systems and unrestricted systems.

And yet another object of the present invention is to provide a fuel system which routes hydrocarbon vapors to a fuel filter canister in a controlled manner during refueling and normal vehicle operation.

Another object of the present invention is to provide an improved ORVR System which provides acceptable customer fill qualities in that premature nozzle shut-offs and fuel spitbacks are prevented.

Additional objects and advantages of the invention will be set forth in part in the following description, or may be obvious from the description, or may be learned through practice of the invention.

To achieve the objects and in accordance with the purposes of the invention, a vapor recovery fuel system is provided having a fuel tank with at least one vent opening defined therein. A fuel vapor trap, such as a charcoal canister filter, is provided in communication with the vent opening to receive fuel vapors from the fuel tank. A refueling control valve is configured with the vent opening. The control valve has a first inlet or orifice and an outlet in communication with the vapor trap. The control valve includes a variably buoyant first float body extending into an interior volume of the fuel tank. This first float body rises and falls over a predetermined range of movement in response to changes in fuel level in the fuel tank during refueling. The control valve further includes a second float body which is engaged by the first float body over at least a portion of the first float body's range of movement. The first float body has a buoyancy during refueling so as to rise with increasing fuel level and engage and move the second float body into a sealing position to seal the inlet orifice from the outlet at a predetermined height of fuel within the fuel tank. The first float body includes a buoyancy reducing mechanism for automatically reducing its buoyancy after refueling so that it lowers in the fuel tank thereby allowing the second buoyant body to lower and unseal the inlet orifice after refueling.

The second float body includes a sealing mechanism or surface for sealing the inlet orifice. The sealing mechanism may also comprise a bleed valve mechanism, such as a needle valve, configured to bleed vapor pressure through the sealing mechanism in an overpressure condition in the fuel tank, such as when the vehicle rolls over and remains in that position for a prolonged period of time. Once the vehicle is uprighted, the vapor pressure which has built up in the fuel tank must be bled in a controlled manner through the sealing mechanism before the second float body will fall from its sealing position.

The system includes a rollover mechanism configured with the second float body to automatically move the second float body to its sealing position upon the control valve being inclined to a predetermined angle, such as the case if the vehicle overturns or is inclined at a steep angle.

The embodiment of the invention incorporating the first float body and second float body provides significant benefits to the user when refueling the system. For example, the system provides for "round up" capability in refueling wherein consumers typically like to round up their fuel bill to the nearest convenient dollar amount, such as a half dollar or whole dollar figure. Upon reaching a first predetermined level of fuel in the tank, the first float body moves the second float body so that the sealing mechanism initially seals the first inlet orifice. At this instant, venting of vapors from the fuel tank is stopped and an immediate overpressure is produced in the fuel tank which shuts off the pressure sensitive fuel nozzle inserted into the filler pipe. However, the sealing mechanism is not actually firmly sealed at this point. This condition allows for an additional amount of fuel to be pumped into the tank after the first shut off. The components are designed so that a known specific force is required to completely seal the device. This force is related to a specific gravity of the fuel and the buoyancy of the first and second float bodies, including the weighted body of the first float body. For example, the components can be designed so that a known additional amount of fuel can be pumped into the tank after the first shut off which will completely seal the device and allow no further round ups. The additional amount of fuel is sufficient to ensure a desired round up is achieved. Accordingly, the float bodies can be designed so that the additional amount of fuel which can be pumped into the tank after the first shut off is precisely determined. In this manner, the exact height of the fuel within the fuel tank can be maintained during refueling.

In yet another preferred embodiment of the invention, the system includes at least one additional vent opening defined in the fuel tank. In this embodiment, the refueling control valve includes a second inlet which is in communication with the additional vent opening through, for example, a vent line, so that fuel vapors from the additional vent opening pass through the refueling control valve to the filtering device. In this embodiment, it is preferred that the second vent opening include a fuel level sensitive automatically actuated vent valve. This vent valve closes at a predetermined level of fuel within the fuel tank to prevent fuel from being pumped to the filtering device in an overfill condition. Typically, the vent valve is disposed at a height below that of the refueling control valve so as to automatically close before the control valve upon refueling. The vent valve also preferably includes a rollover device to automatically close the vent valve upon a rollover condition of the vehicle.

In an unrestricted system, the refueling control valve provides an uninhibited passage between the second inlet and the outlet during refueling and normal operation. The refueling vent valve according to the invention can be easily adapted for a restricted system by disposing an automatic isolation mechanism in the valve to isolate the second inlet from the opening in the control valve. Upon commencing refueling, this isolation mechanism automatically seals the second inlet so that the only vapors vented to the filter device during refueling pass through the first inlet orifice of the control valve. Once refueling is complete, the automatic isolation mechanism unseals the second inlet and seals the first inlet orifice so that, during normal operations, the only fuel vapors vented to the filtering device are from the additional vent openings which pass through the second inlet of the control valve. In a preferred embodiment, the automatic isolation mechanism comprises a magnetically actuated flapper device configured within the control valve. This flapper device may comprise a movable magnet which pulls a metallic body carried by the flapper device. The movable magnet is moved automatically by an actuation device, such as a cable, upon commencing refueling. The cable may be connected, for example, to the refueling door of the vehicle so as to be actuated upon opening of the fuel door.

In further accordance with the objects and advantages of the invention, a refueling control valve is provided for controlling venting of fuel vapors in a fuel system from a fuel tank to a vapor trap during refueling operations. The control valve is easily adapted to a restricted system or unrestricted system by simply removing an isolation mechanism from the valve. The control valve operates essentially as described above.

In still a further alternative embodiment according to the objects of the invention, a vapor recovery fuel system is provided having a fuel tank with at least one vent opening defined therein. A fuel vapor trap, such as a fuel filtering canister, is in communication with the vent opening to receive fuel vapors from the fuel tank. The system includes a magnetically controlled refueling valve configured with the vent opening. The refueling valve has an inlet in communication with the vent opening and an outlet in communication with the vapor trap. The refueling valve further comprises a magnetically controlled sealing device configured to automatically seal the inlet from the outlet during non-refueling operations and to automatically unseal the inlet from said outlet during refueling. The magnetically controlled sealing device may include a swinging valve flapper device, a magnetic source, and a mobile magnetic member moved by the magnetic source thereby causing the flapper device to swing between an open position wherein the inlet orifice communicates with the outlet and a closed position wherein the inlet orifice is sealed from the outlet. The magnetic source may comprise a movable magnet and the mobile magnetic member may comprise a metallic body or ball which follows the movable magnet. In one embodiment of the invention, the movable magnet is connected to an opening device of the vehicle which provides access to the filler pipe, such as the fuel door of the vehicle.

The system may also include a float valve configured with the magnetic control valve to automatically seal the inlet from the outlet during refueling at a predetermined fuel level thereby preventing an overfill condition of the tank. The float valve also preferably includes a rollover device configured therewith to automatically seal the inlet orifice from the outlet upon the control valve being inclined to a predetermined angle. The float valve may also comprise a sinking float body which fills at least partially with fuel after refueling so as to change buoyancy and automatically unseal said inlet orifice after refueling.

DETAILED DESCRIPTION OF THE PREFERRED EMBODIMENTS

Figure 1:
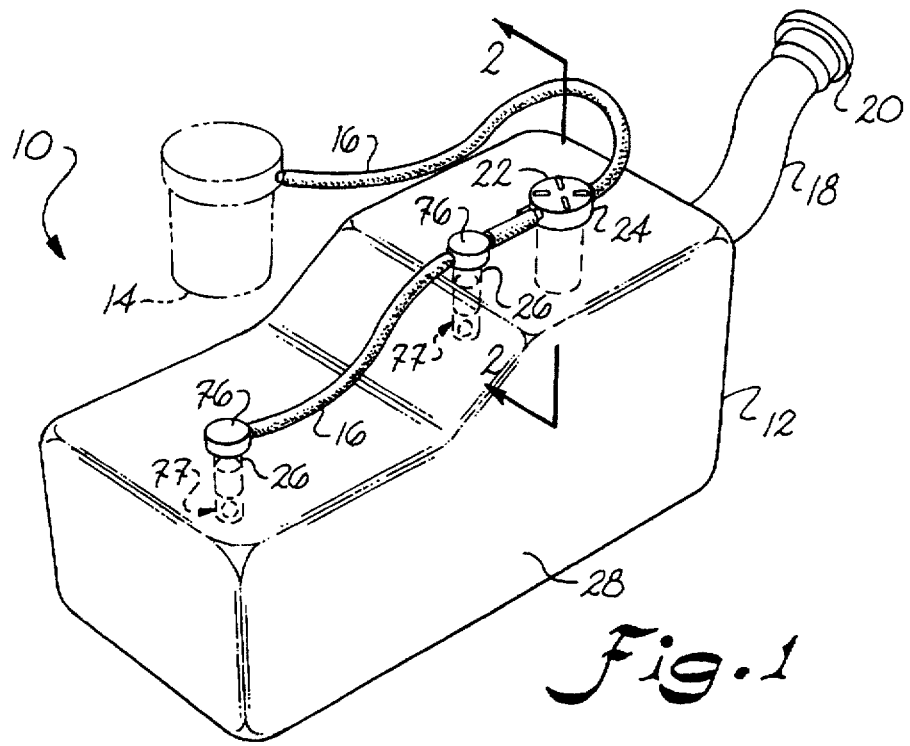
FIG. 1 is a perspective component view of a vapor recovery fuel system according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

The present invention relates to a vapor recovery fuel system, as depicted generally in FIG. 1. This fuel system can be utilized with any conventional vehicle, such as an automobile, truck, and so forth. The fuel system may also have applications in marine vessels and aircraft. System 10 includes a fuel tank 12 for storing liquid fuel and a filler pipe 18 with filler head device 20 for introducing fuel into tank 12. As discussed generally in the background section of this application, conventional fuel systems generate fuel vapors within the tank, particularly hydrocarbon gases. Upon refueling the tank, these gases are displaced by the incoming liquid fuel and it is desired to vent and filter the gases without expelling the gases to the atmosphere. Also, fuel vapors are continuously generated during operation of the vehicle and it is also desirable to vent the gases during normal operation of the vehicle, not just during refueling conditions. Accordingly, the present invention relates to an onboard refueling vapor recovery (ORVR) system for venting the fuel vapors or gases in a controlled manner during both refueling and normal operations of the vehicle. Referring again to FIG. 1 in general, system 10 also includes at least a first vent opening 24, and preferably additional vent openings 26 defined in tank 12 to provide access to interior volume 28 of tank 12. The vent openings are in communication through, for example, vent lines 16 wherein the fuel vapors are vented to a vapor trap or filtering device 14. Any manner of conventional filtering device 14 can be utilized in this regard, particularly charcoal canisters and the like. The invention is not limited to any particular type of filtering device.

Vent valves 76 are disposed at the additional vent openings 26 to direct fuel vapors to vapor trap 14. Vent valves 76 can comprise any manner of conventional vent valve, and preferably also utilize a rollover device 77 to automatically shut valve 76 upon a rollover of the vehicle or steep angle of inclination. Such rollover mechanisms are well known in the art and a detailed description thereof is not necessary for purposes of this disclosure. Vent valves 76 also are preferably float actuated valves that automatically close upon the fuel level in the tank rising to the level of the valve so as to prevent fuel from being pumped through vent lines 16 to canister 14. Any manner of conventional float shut off mechanism can be utilized in this regard. At this point, it should be understood that the present invention is not limited to any particular type of vent valve 76.

System 10 also includes a refueling control valve, generally 24 in FIG. 1. In the preferred embodiment of the invention, control valve 22 is disposed in series with the additional vent valves 76 so that gases or fuel vapor vented through valves 76 pass through control valve 22 before being conveyed to filtering device 14. In this manner, control valve 22 can control the amount of vapor conveyed to filtering device 14 during normal operation and refueling operations, as will be described in detail below. It should be understood that any manner or arrangement of additional vent valves can be utilized with the system, and that the configuration shown in FIG. 1 is merely for illustrative purposes.

During refueling operations, fuel is pumped into tank 12 through filler head 20 and filler pipe 18. As the fuel level rises in the tank, vapors above the liquid fuel must be vented. Vent valves 76 are disposed generally at a height in the tank below that of control valve 22 and, in an unrestricted system, will vent fuel vapors through control valve 22 to canister 14 until the fuel level rises to a height causing vent valves 76 to automatically close. In a restricted system, valves 76 would be automatically isolated from canister 14 immediately upon commencing refueling, as will be explained in more detail below.

Modern fuel systems are designed so that at a maximum fuel level in tank 12, a vapor dome 43 still exists in the tank. Accordingly, the amount of fuel, or height of fuel, in the tank must be assured. In other words, the operator should not be able to overfill the system. The volume of the vapor dome, or height of fuel in the tank, is established by the manufacturer and depends essentially on the design and configuration of tank 12. Refueling control valve 22 ensures that the fuel vapors are vented from the tank during refueling so that fuel can be pumped into the tank and ensures that the tank cannot be overfilled.

Figure 2:
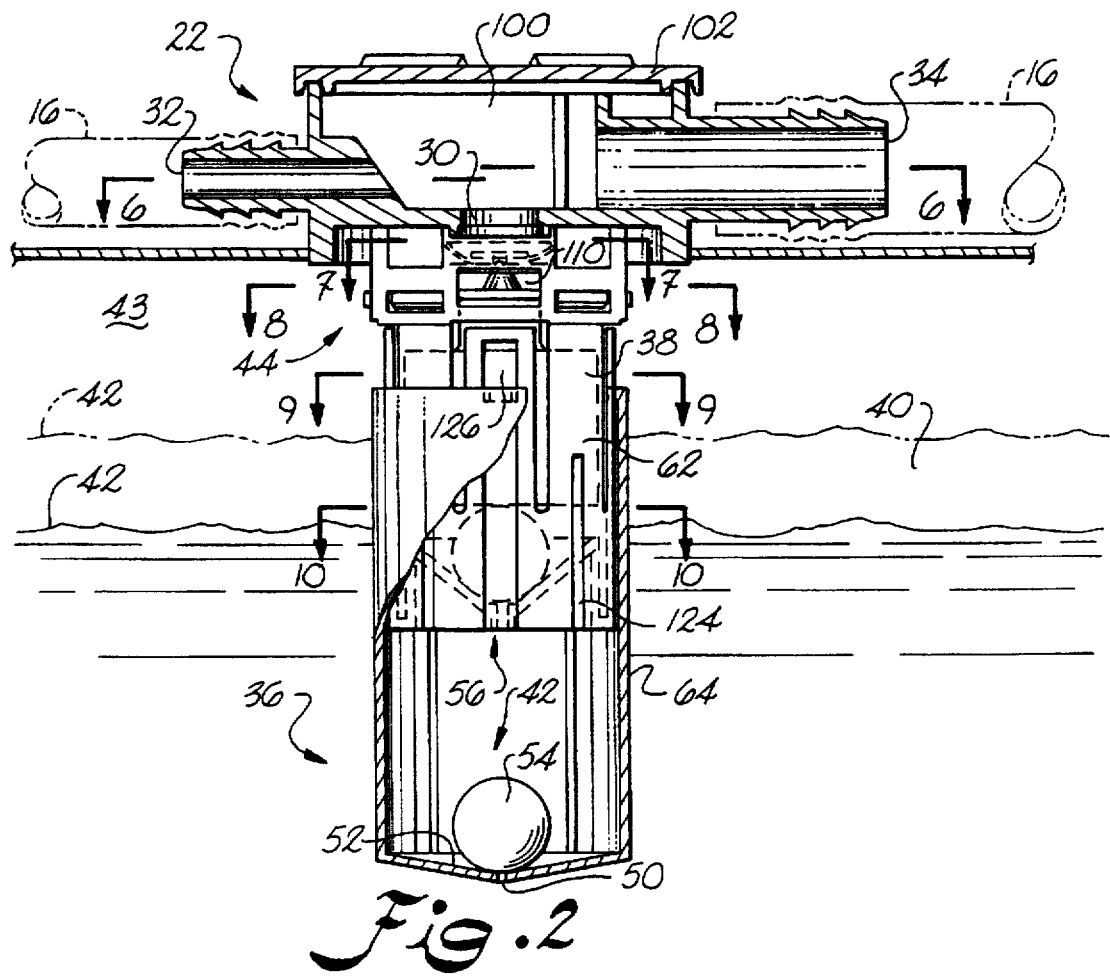
FIG. 2 is a cross-sectional view of a refueling control valve utilized in the system of FIG. 1.
Figure 3:
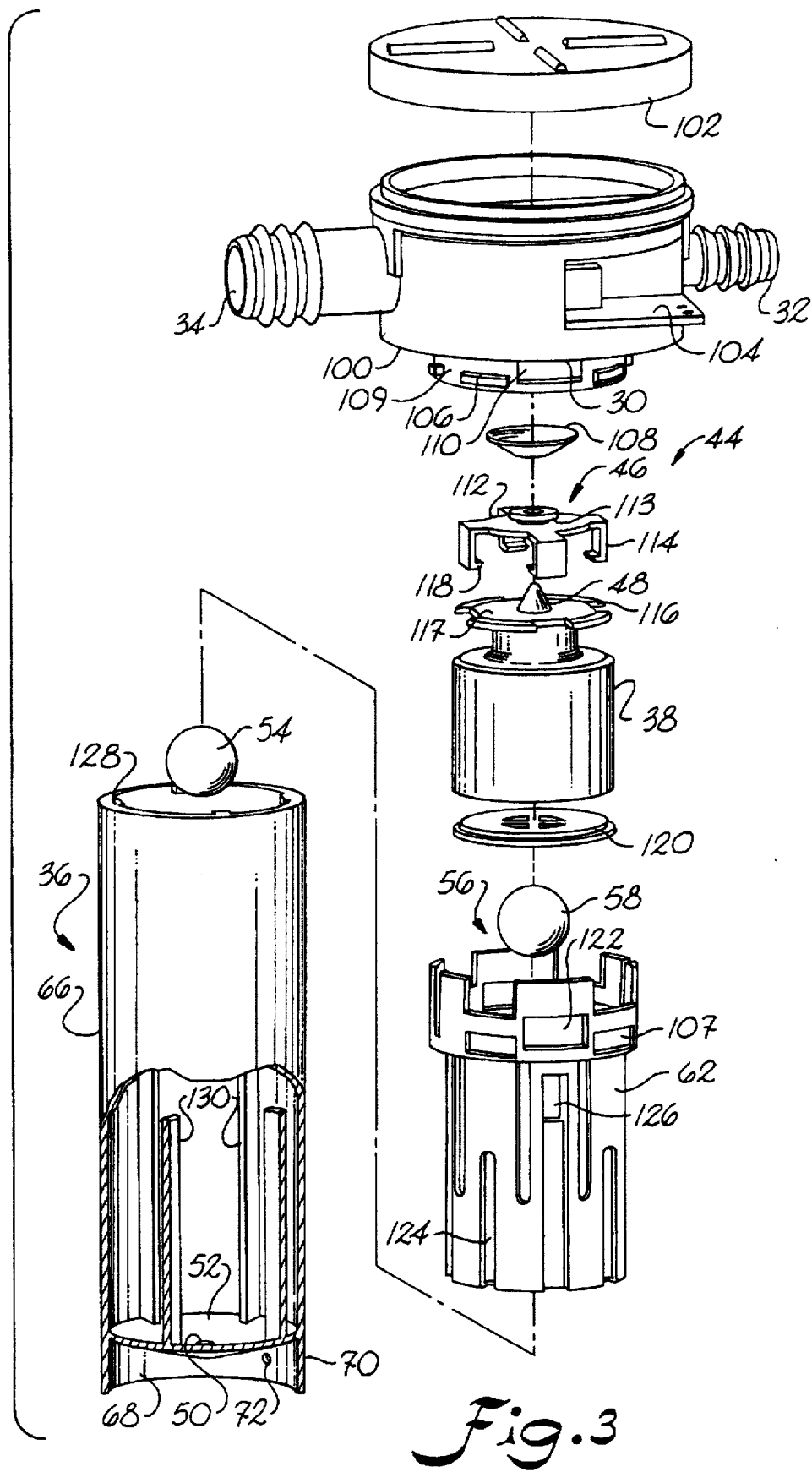
FIG. 3 is an inline component view of the refueling control valve.

Referring particularly to FIGS. 2 and 3, control valve 22 comprises a first inlet orifice 30 and an outlet 34 defined in a valve body 100. Outlet 34 is in communication with filtering device or vapor trap 14 through vent lines 16. In the embodiment illustrated, first inlet orifice 30 is defined through a bottom surface of valve body 100. Access to orifice 30 is provided by way of orifice slots 110 defined in a ring member 109 generally surrounding orifice 30. A plurality of slots 110 are disposed circumferentially around ring member 109. First inlet orifice 30 is in direct communication with outlet 34. Orifice slots 110 are disposed below the level of tank 12 in the vapor dome 43 of the system, as particularly shown in FIG. 2. In this manner, fuel vapors displaced by fuel 40 during refueling are able to enter orifice 30 through orifice slots 110 and exit valve 22 through outlet 34.

Figure 4:
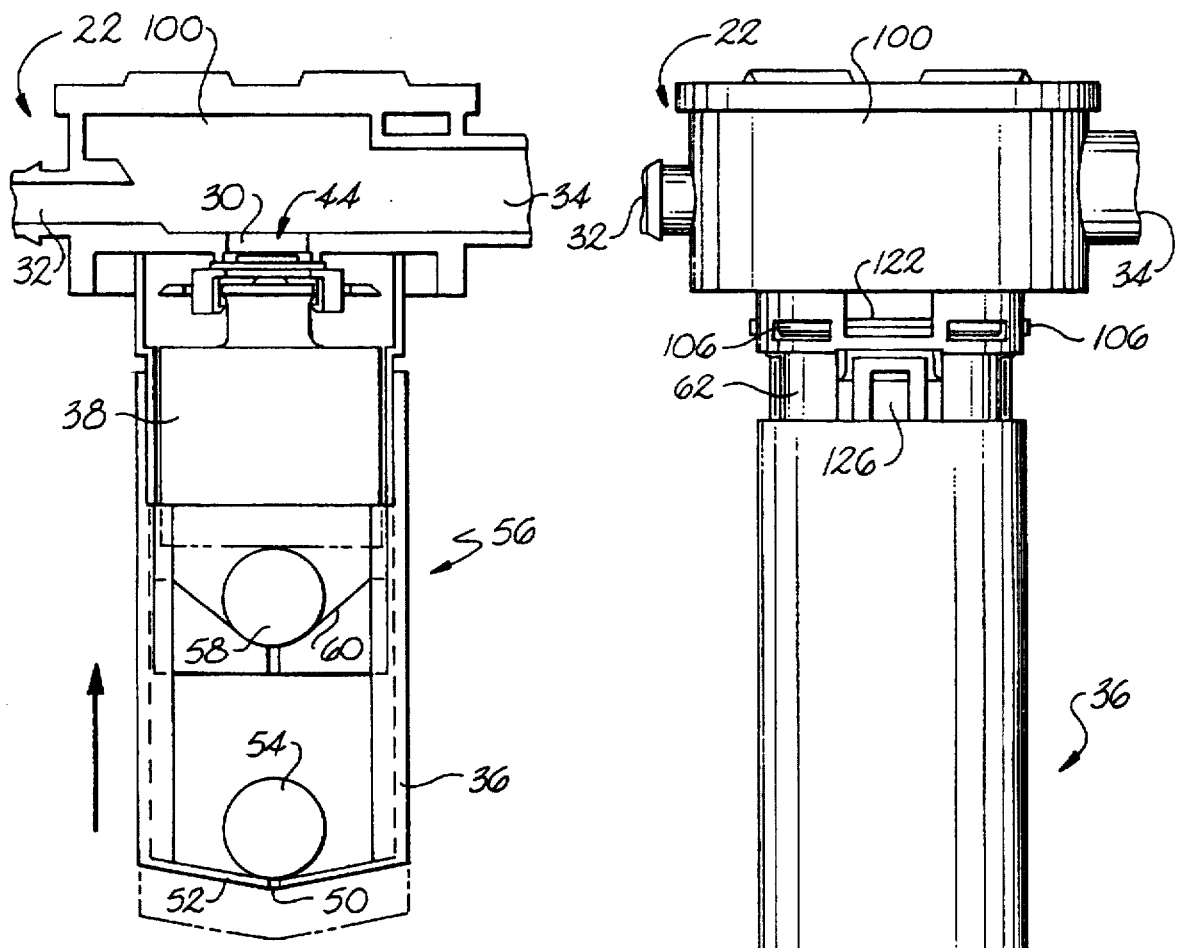
FIG. 4 is a partial diagrammatic view of the refueling control valve particularly showing the range of movement of the float body.

Valve 22 also includes a first float body 36 and a second float body 38, as shown in detail in FIGS. 2 through 4. First float body 36 may comprise a generally hollow body 64 having a bottom surface 52 with an orifice 50 defined therethrough. As will be described in more detail below, first float body 36 is variably buoyant in that it has a first buoyancy characteristic during refueling which causes the float body to rise with increasing fuel level to eventually cause second float body 38 to move and seal orifice 30. After refueling, first float body 36 changes its buoyancy so as to sink in fuel 40 causing second float body 38 to unseal from orifice 30.

In the embodiment of the invention illustrated, valve 22 includes a cage structure or member 62 which is attached to the bottom of valve body 100 by means of retaining tabs 106 engaging in retaining slots 107 defined through cage structure 62. Cage structure 62 generally surrounds second float body 38. Cage structure 62 also includes engaging slots 124 defined therethrough. First float body 36 includes engaging ribs 130 defined longitudinally along the inner circumferential surface thereof. Ribs 130 extend through slots 124 so as to physically engage the bottom of second float body 38. Cage structure 62 also includes a plurality of longitudinal range slots 126 defined therein. First float body 36 includes a matching number of range tabs 128 which engage in corresponding range slots 126. Thus, the range of movement of first float body 36 with respect to cage structure 62 is defined by the longitudinal length of range slots 126. In other words, first float body 36 will drop with decreasing levels of fuel until range tabs 128 engage the bottom of slots 126. Likewise, as the fuel level in tank 12 rises, first float body 36 will also rise due to its buoyancy until range tabs 128 engage the upper limits of slots 126. As first float body 36 rises with increasing fuel level, ribs 130 extending through engagement slots 124 contact the bottom end cap 120 of second float body 38 thereby pushing second float body 38 toward orifice 30.

Second float body 38 is movably housed within cage structure 62 and includes a sealing mechanism 44 for sealing orifice 30 at a predetermined height or level of fuel within tank 12. In the embodiment illustrated, sealing device 44 includes a sealing flange 108 which is pressed against the defining member of orifice 30. Flange 108 can comprise any manner of elastomeric or sealing material. Flange 108 is carried by a sealing platform 112. Platform 112 has downwardly extending guide arms 114 with retaining hook members 118. Guide arms 114 cooperate with guide slots 116 defined in the upper portion of second float body 38. During normal operation of the valve, platform 112 rests against face 117 of second float body 38. Flange 108 is retained on platform 112 by means of retaining ring 113.

Second float body 38 also preferably includes a mechanism for bleeding pressure through sealing device 44 in the event of an overpressure condition inside of tank 12 which would not otherwise allow second float body 38 to disengage from its sealing position. This may happen, for example, if the vehicle has flipped over and remains in that condition for an extended period of time such that the rollover mechanisms in the vent valves have closed and the fuel vapors generated in the tank have not been able to escape. Once the vehicle is uprighted, the excessive vapor pressure in the vapor dome 43 must be vented before second float body 38 will disengage from its sealing position. For this purpose, float body 38 includes a bleed valve 46. Bleed valve 46 may comprise a needle valve assembly 48. Needle valve assembly 48 extends through a pin hole defined in platform 112 and through sealing flange 108. Once the vehicle is uprighted, the weight of second float body 38 will cause the float body to move downwards relative to platform 112 for at least the length of guide arms 114. This allows needle valve 48 to disengage from its respective hole in platform 112 allowing vapor pressure to bleed through the needle valve. Once the pressure in the dome has equalized through the needle valve, platform 112 will also drop from its sealing position.

Figure 10:
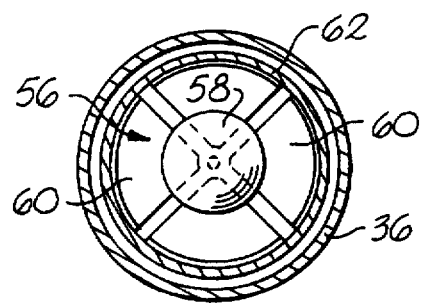
FIG. 10 is a cut-away view taken along the lines indicated in FIG. 2.

Valve 22 also preferably includes a rollover mechanism, generally 56, incorporated therein. Referring particularly to FIGS. 2, 3, and 10, rollover mechanism 56 includes a rolling weighted body 58, such as a steel ball. Weighted body 58 is carried by cage structure 62 which has inclined rolling surfaces 60 defined at the bottom thereof. At a certain angle of inclination of the valve, such as on a rollover condition of the vehicle, weighted body 58 will roll by gravity towards orifice 30 thereby forcing second float body 38 and sealing mechanism 44 to seal orifice 30. Once the vehicle is uprighted or the angle of inclination of the valve is decreased, weighted ball 58 will return to its rest position allowing second float body 38 to disengage from its sealing position. It should be understood that the angle of inclination of inclined rolling surfaces 60 will dictate the angle at which the rollover mechanism actuates. This type of rollover mechanism 56 may also be utilized in the additional vent valves 76 as mentioned above.

First float body 36 also includes a buoyancy reducing mechanism, generally 42. Mechanism 42 in the embodiment illustrated includes a freely movable weighted body 54, such as another steel ball, carried within hollow body 64, as particularly seen in FIGS. 2 through 5. Weighted body 54 rests on a bottom angled surface 52 of hollow body 64. Angled surface 52 forms an essentially conical surface for weighted body 54. An orifice 50 is defined through the bottommost portion of surface 52. When the vehicle is at an essentially level position for refueling, freely movable body 54 rests on surface 52 in the position illustrated in FIGS. 4 and 5 so as to seal orifice 50. Orifice 50 remains sealed by weighted body 54 as the fuel level rises within the tank 12 thereby preventing fuel from entering hollow body 64. Thus, first float body 36 retains a specific desired buoyancy which is sufficient to lift the weight of first float body 36, weighted body 54, and second float body 38. Once refueling is complete and the vehicle starts to move, freely movable body 54 tends to roll on surface 52 thereby exposing or unsealing orifice 50. At this point, liquid fuel gradually seeps into hollow body 64 through orifice 50 thereby reducing the buoyancy of first float body 36. Once enough fuel has entered hollow body 64, the float body will move downwards and second float body 38 will disengage from its sealing position. At this point, control valve 22 acts as a conventional vent valve and rollover mechanism for fuel vapors in an unrestricted system during normal operation of the vehicle.

In an alternative preferred embodiment of the invention particularly illustrated in FIG. 3, first float body 36 may comprise a first section 66 delimited by bottom surface 52, and a second bottomless section 68 defined by sides or skirt section 70. A second orifice 72 is defined through section 70. The operation of this embodiment will be described in more detail below.

FIGS. 7 through 10 show various cross cuts of the valve components described above taken along the lines indicated in FIG. 2 and are provided for a clearer understanding of the arrangement of the components.

FIGS. 2 through 6 illustrate an unrestricted vapor recovery system. In this system, control valve 22 includes a second inlet 32 which is connected to the additional vent valves 76 through a vent line 16, as generally illustrated in FIG. 1. Inlet 32 communicates directly with outlet 34. In this way, vent valves 76 vent fuel vapors through control valve 22 during normal operations and refueling operations. Also, orifice 30 is in direct communication with outlet 34 so that control valve 22 in essence acts as an additional vent valve during normal operations of the vehicle. With the fuel level in tank 12 being relatively low, first float body 36 is at its lowest position and fuel vapors are free to enter orifice 30 through orifice slots 110 and vent to filtering device 14 through outlet 34. Eventually, system 10 must be refueled.

As fuel is pumped into tank 12, the fuel level rises and will eventually shut the additional vent valves 76. At this point, the only fuel vapor being vented from the system is through control valve 22. As the fuel level continues to rise, first buoyant body 36 will move from its first position illustrated in dashed lines in FIG. 4 to its sealing position shown in solid lines wherein sealing mechanism 44 seals orifice 30. In this process, weighted body 54 seals orifice 50 so that first float body 36 maintains its buoyancy. An overpressure condition is generated in tank 12 as soon as sealing mechanism 44 first seals orifice 30 since the relief path for vapors will be closed as fuel is being simultaneously pumped into the system. This will cause the fuel nozzle at the filling station to shut off due to the sensed overpressure. However, the operator will still be allowed to pump an additional round up of fuel, for example, from the level indicated at 41 in FIG. 2 to the level indicated at 42. This is due to the fact that sealing device 44 does not stay completely seated and sealed in its sealing position at the initial contact of sealing mechanism 44. From the weight and characteristics of the first and second float bodies and sealing mechanism, one can calculate the sealing force or pressure required to maintain the second float body sealed against the orifice. For example, with embodiments tested by applicants, a sealing force of approximately 8 grams is required to completely seal orifice 30 with sealing mechanism 44. The 8 grams of sealing force is generated by the additional amount of fuel pumped into the tank after the first shut off. Since the weight of the float bodies 36, 38 and weighted member 54 are known, as well as the specific gravity of the fuel, the amount of additional fuel which can be pumped into the system before the final sealing force is reached can be easily calculated. For example, in embodiments tested by applicants, it is known that an additional 8 millimeters in height of fuel can be pumped into tank 12 from the first shut off, wherein the sealing forces essentially 0 grams, until the sealing force reaches 8 grams. Thus, it should be understood that the components of the control valve can be designed and sized so that a known specific volume of fuel can be pumped into tank 12 after the first shut off. Once the sealing mechanism reaches its required sealing force, no additional vapor can escape through valve 22 and no additional fuel can be pumped into tank 12.

Figure 5:
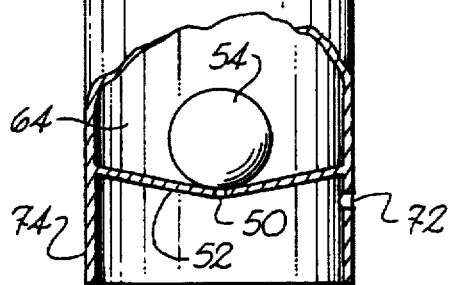
FIG. 5 is a perspective view shown in partial cut-away of the refueling control valve particularly illustrating the skirt section of the first float body.
Figure 6:
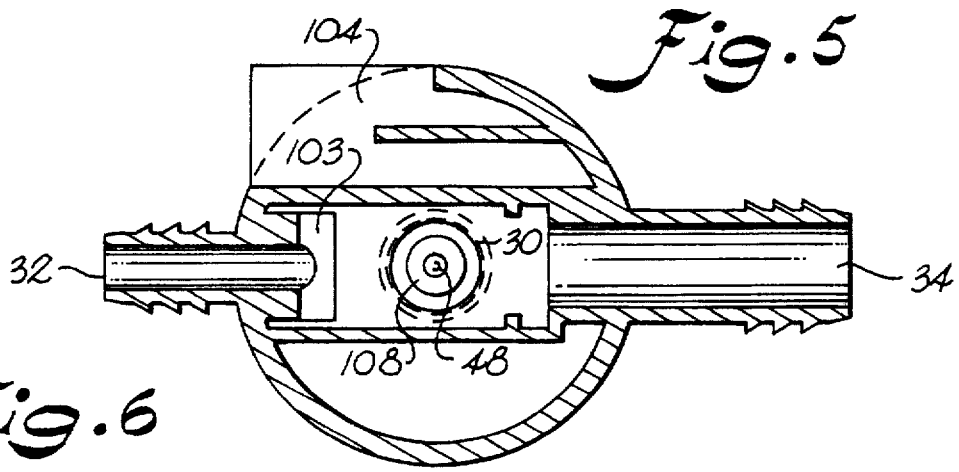
FIG. 6 is a cut-away view taken along the lines indicated in FIG. 2.
Figure 7:
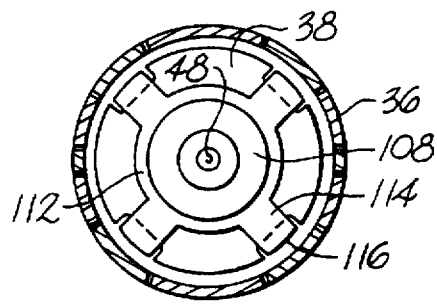
FIG. 7 is a cut-away view taken along the lines indicated in FIG. 2.
Figure 8:
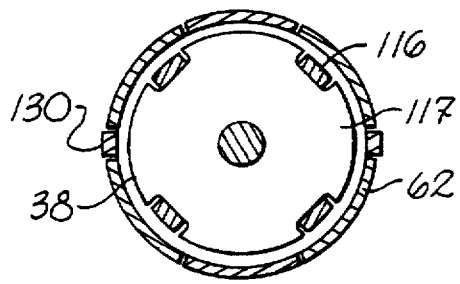
FIG. 8 is a cut-away view taken along the lines indicated in FIG. 2.
Figure 9:
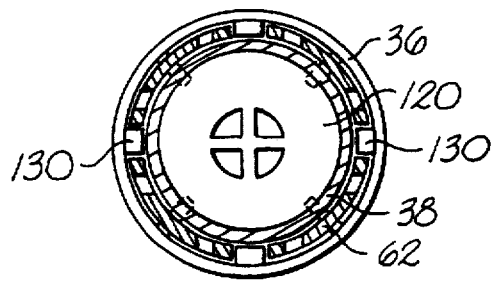
FIG. 9 is a cut-away view taken along the lines indicated in FIG. 2.

In the alternative embodiment of the device illustrated in FIGS. 3 and 5, additional round ups of fuel are available to the operator due to the skirt section 74 and second orifice 72. As fuel rises in the tank and contacts the bottom of skirt section 74, vapors are entrapped in the skirt section which increases the buoyancy of float body 36. The valve will experience its first shut off as described above. However, the vapors trapped within skirt section 74 will immediately tend to escape through second orifice 72 allowing fuel to fill skirt section 74 thereby reducing the buoyancy of float body 36. Thus, additional fuel must be pumped into the tank to force the now reduced buoyant float body 36 to rise and move second float body 38 to its initial sealing position at 0 grams of sealing force wherein another shut off will occur. At this point, an additional round up of fuel can be added to tank 12 until the required sealing force of around 8 grams is obtained, as described above. At this point, no additional fuel can be added into tank 12.

Once the vehicle starts to move after refueling, weighted body 54 will roll or move within hollow cylinder 64 allowing fuel to enter into body 64 through orifice 50. Thus, first float body 36 will lose buoyancy and move downwards allowing second float body 38 to unseal from orifice 30. At this point, refueling control valve 22 acts as an additional vent valve in unrestricted systems.

Figure 11:
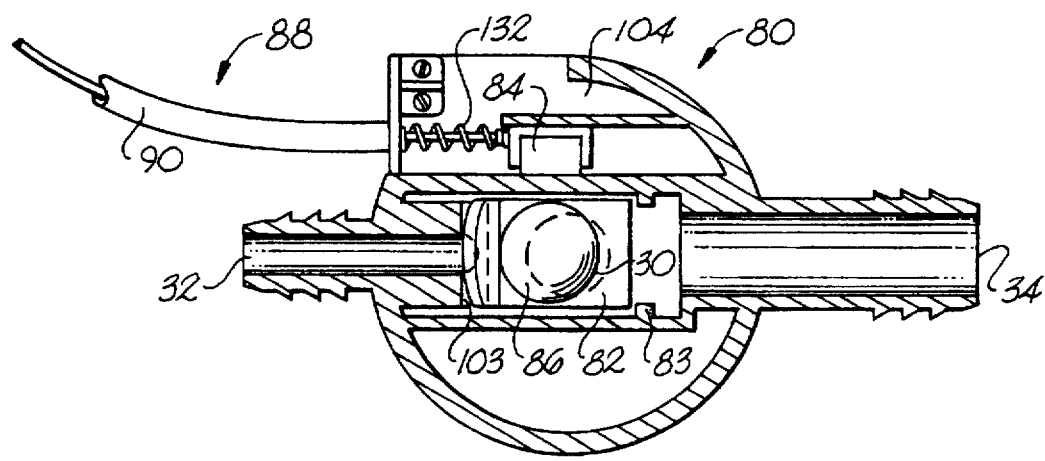
FIG. 11 is a perspective top cut-away view of a magnetically controlled refueling valve according to the invention.
Figure 12:
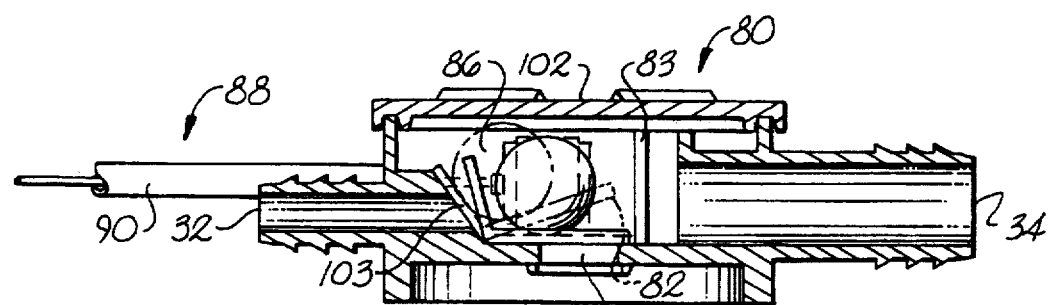
FIG. 12 is a side cut-away view of the magnetically controlled refueling valve particularly illustrating the alternate positions of the magnetically controlled flapper device.
Figure 13:
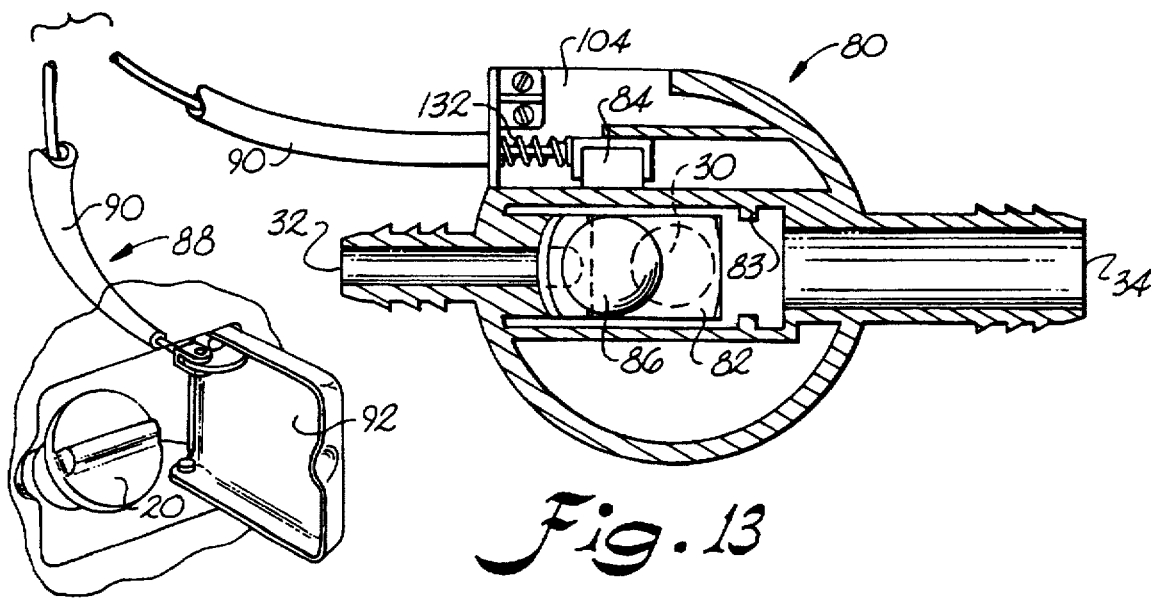
FIG. 13 is a partial component view of the magnetically controlled valve particularly illustrating the actuation device.

Control valve 22 can be readily configured as a magnetically controlled refueling valve for use in a restricted system by placement of an automatic isolation mechanism 80 within valve body 100. Referring particularly to FIGS. 11 through 13, automatic isolation mechanism 80 includes a movable flapper device 82 formed by angled members. Flapper device 82 carries a metallic body 86 which can move within valve body 100. An inclined face 103 is defined at inlet 32 within valve body 100. Flapper device 82 will tilt and seat against inclined face 103 upon movement of metallic body 86 in that direction. Tabs 83 are provided to prevent metallic body 86 from sealing outlet 34.

Isolation mechanism 80 further includes a movable magnet 84 disposed in a bracket assembly 104 of valve body 100. Magnet 84 is moved or controlled by an actuation device 88, such as cable 90. A spring mechanism 132 may be provided to bias magnet 84 to a normal non-fueling position. Referring particularly to FIG. 13, actuation device 88 may include a fuel door 92 which is opened to provide access to filler head 20. Cable 90 is connected to door 92 so that as door 92 opens, movable magnet 84 is moved towards inlet 32. Metallic body 86 follows movement of magnet 84 and causes flapper device 82 to tilt and seat against inclined face 103 essentially sealing inlet 32. The opposite member of flapper device 82 tilts upward and unseals orifice 30. Thus, during refueling with fuel door 92 in the open position, inlet 32 is sealed by flapper device 82 and the only fuel vapors vented from tank 12 pass through orifice 30. The float bodies and remaining components of the valve are essentially as described above. Once refueling is complete, and fuel door 92 is closed, movable magnet 84 is biased to its non-fueling position by spring mechanism 132 which draws metallic body 86 to its non-fueling position as indicated in solid lines in FIG. 12. In this position, flapper device 82 seals orifice 30 and unseals inlet 32. In this manner, during non-fueling operations, the only fuel vapors vented from tank 12 are through the additional vent valves 76 and second inlet 32.

It should be understood that the magnetic isolation mechanism described herein with regards to FIGS. 11 through 13 is but a mere embodiment of one type of suitable actuation mechanism. For example, any manner of magnetic source may be applied to move metallic body 86. For example, an electric magnetic generating device may be used. Additionally, spring loaded isolation devices, or any other mechanical isolation devices may also be utilized. It is within the scope and spirit of the invention to include any suitable isolation mechanism in this regard.

The valve described herein is particularly useful from a manufacturing and cost standpoint in that the valve can be readily configured for unrestricted and restricted systems. The only difference between the valves in either configuration is the automatic isolation mechanism 80. Flapper device 82 and metallic ball 86 are relatively inexpensive components and are simply dropped into valve body 100 if the valve is utilized in a restricted system. Bracket assembly 104 defined in valve body 100 does not affect operation of the valve in an unrestricted system and is readily configured with movable magnet 84.

It should be apparent to those skilled in the art that various modifications and variations can be made in the present invention without departing from the scope and spirit of the invention. For example, components indicated and described as separate components can be formed integral with other components. Additionally, it should be apparent that the relative sizes and weights of the components can vary depending on the particulars of the fuel system in which the control valves are utilized. It is intended that the present invention cover such modifications and variations as come within the scope of the appended claims and their equivalents.

What is claimed is:

1. A vapor recovery fuel system, comprising:

a fuel tank having at least one vent opening defined therein;

a fuel vapor trap in communication with said vent opening to receive fuel vapors from said fuel tank; and a refueling control valve configured with said vent opening, said control valve having a first inlet and an outlet in communication with said vapor trap, said control valve comprising a variably buoyant first float body extending into an interior volume of said fuel tank which rises over a predetermined range of movement in response to increasing fuel level in said fuel tank during refueling, said control valve further comprising a second float body movable relative to said first float body and engaged by said first float body over at least a portion of said range of movement, said first float body having a buoyancy during refueling so as to rise with increasing fuel level and engage and move said second float body into a sealing position to seal said inlet from said outlet at a predetermined height of fuel within said fuel tank, said first float body having a buoyancy reducing mechanism for automatically reducing its buoyancy after refueling so that it lowers in said fuel tank allowing said second float body to lower and unseal said inlet after refueling.

2. The system as in claim 1, wherein said second float body further comprises a sealing mechanism for sealing said inlet.

3. The system as in claim 2, wherein said sealing mechanism further comprises a bleed valve mechanism configured to bleed vapor pressure through said sealing mechanism in an over pressure condition in said fuel tank thereby allowing said second float body to fall from said sealing position.

4. The system as in claim 1, wherein said buoyancy reducing mechanism comprises an orifice defined in a bottom surface of said first float body and a freely movable weighted body carried within said first float body, said weighted body movable from a rest position during refueling in which it seals said orifice to alternate positions wherein fuel seeps into said fist float body through said orifice after refueling.

5. The system as in claim 4, wherein said bottom surface comprises an angled surface.

6. The system as in claim 1, further comprising a rollover mechanism configured with said second float body to automatically move said second float body to said sealing position upon said control valve being inclined to a predetermined angle.

7. The system as in claim 1, wherein said first float body comprises a generally hollow body having a first section delimited by a bottom with an orifice defined therethrough which is sealed during refueling by an orifice sealing device, and a second bottomless section defined by sides with a second orifice defined therethrough wherein fuel vapors entrapped in said second section during refueling escape through said second orifice thereby changing the buoyancy of said first float body during refueling.

8. The system as in claim 7, wherein said first section of said first float body comprises a cylinder and said second section comprises a skirt section adjacent said cylinder.

9. The system as in claim 1, further comprising at least one additional vent opening defined in said fuel tank, said refueling control valve further comprising a second inlet in communication with said additional vent opening such that fuel vapors from said additional vent opening pass through said refueling control valve to said vapor trap.

10. The system as in claim 9, further comprising a fuel level sensitive actuable vent valve configured with said additional vent opening, said vent valve automatically closing at a predetermined level of fuel within said fuel tank.

11. The system as in claim 10, wherein said vent valve is disposed at a height below that of said refueling control valve so as to automatically close before said control valve upon refueling.

12. The system as in claim 10, wherein said vent valve further comprises a rollover device to automatically close said vent valve upon said vent valve being inclined to a predetermined angle.

13. A vapor recovery fuel system, comprising:

a fuel tank having at least one vent opening defined therein;

a fuel vapor trap in communication with said vent opening to receive fuel vapors from said fuel tank; and a refueling control valve configured with said vent opening, said control valve having a first inlet and an outlet in communication with said vapor trap, said control valve comprising a variably buoyant first float body extending into an interior volume of said fuel tank which rises over a predetermined range of movement in response to increasing fuel level in said fuel tank during refueling, said control valve further comprising a second float body engaged by said first float body over at least a portion of said range of movement, said first float body having a buoyancy during refueling so as to rise with increasing fuel level and engage and move said second float body into a sealing position to seal said inlet from said outlet at a predetermined height of fuel within said fuel tank, said first float body having a buoyancy reducing mechanism for automatically reducing its buoyancy after refueling so that it lowers in said fuel tank allowing said second buoyant body to lower and unseal said inlet after refueling, said control valve further comprising a rollover mechanism configured with said second float body to automatically move said second float body to said sealing position upon said control valve being inclined to a predetermined angle, wherein said rollover mechanism comprises a rolling weighted body resting on an inclined rolling surface generally below said second float body, said rolling weighted body automatically moving said float body to said sealing position by gravity at said predetermined angle, said inclined surface having an angle which dictates said predetermined angle at which said rollover device actuates.

14. The system as in claim 13, further comprising a cage structure generally surrounding said second float body, said rollover mechanism disposed within said cage structure, said first float body engaging said second float body through said cage structure.

15. A vapor recovery fuel system, comprising:
a fuel tank having at least one vent opening defined therein;
a fuel vapor trap in communication with said vent opening to receive fuel vapors from said fuel tank;
a refueling control valve configured with said vent opening, said control valve having a first inlet and an outlet in communication with said vapor trap, said control valve comprising a variably buoyant first float body extending into an interior volume of said fuel tank which rises over a predetermined range of movement in response to increasing fuel level in said fuel tank during refueling, said control valve further comprising a second float body engaged by said first float body over at least a portion of said range of movement, said first float body having a buoyancy during refueling so as to rise with increasing fuel level and engage and move said second float body into a sealing position to seal said inlet from said outlet at a predetermined height of fuel within said fuel tank, said first float body having a buoyancy reducing mechanism for automatically reducing its buoyancy after refueling so that it lowers in said fuel tank allowing said second buoyant body to lower and unseal said inlet after refueling;
at least one additional vent opening defined in said fuel tank, said refueling control valve further comprising a second inlet in communication with said additional vent opening such that fuel vapors from said additional vent opening pass through said refueling control valve to a vapor trap, wherein said refueling control valve further comprises an automatic isolation mechanism configured therein to isolate said additional vent opening from said vapor trap upon refueling.

16. The system as in claim 15, wherein said automatic isolation mechanism comprises a magnetically actuated flapper device configured within said control valve to move to a position to seal said second inlet automatically upon commencing refueling so that the only fuel vapors vented to said vapor trap during refueling pass through said first inlet.

17. The system as in claim 16, wherein said flapper device comprises a movable magnet which pulls a metallic body carried by said flapper device, said movable magnet moved automatically by an actuation device upon commencing refueling.

18. The system as in claim 16, wherein after refueling said flapper device moves automatically to an alternate position wherein it seals said first inlet so that during no-refueling conditions the only fuel vapors vented to said vapor trap pass through said second inlet.

19. A refueling control valve for controlling venting of fuel vapors in a fuel system from a fuel tank to a vapor trap during refueling operations to prevent an overfill condition or saturation of the vapor trap, said control valve comprising a first inlet configured to receive fuel vapors and an outlet configured to direct fuel vapors to a vapor trap, said control valve comprising a first float body having a length so as to extend into an interior volume of a fuel tank, said first float body having a first buoyancy characteristic so as to rise over a predetermined range of movement in response to increasing fuel level in said fuel tank during refueling, said control valve further comprising a second float body movable relative to said first float body and physically engaged by said first float body over at least a portion of said range of movement, said first float body engaging and moving said second float body into a sealing position to seal said inlet from said outlet at a predetermined height of fuel within said fuel tank, said first float body having a buoyancy reducing mechanism for reducing its buoyancy to a second characteristic after refueling so that it lowers in said fuel tank allowing said second float body to lower and unseal said inlet.

20. The control valve as in claim 19, wherein said second float body further comprises a sealing mechanism for sealing said inlet.

21. The control valve as in claim 20, wherein said sealing mechanism further comprises a bleed valve mechanism configured to bleed vapor pressure through said sealing mechanism in an over pressure condition in said fuel tank thereby allowing said second float body to fall from said sealing position.

22. The control valve as in claim 19, wherein said buoyancy reducing mechanism comprises an orifice defined in a bottom surface of said first float body and a freely movable weighted body carried within said first float body, said movable weighted body movable from a rest position during refueling in which it seals said orifice to alternate positions wherein fuel seeps into said first float body through said orifice after refueling.

23. The control valve as in claim 19, further comprising a rollover mechanism configured with said second float body to automatically move said second float body to said sealing position upon said control valve being inclined to a predetermined angle.

24. The control valve as in claim 19, wherein said first float body comprises a generally hollow body having a first section delimited by a bottom with an orifice defined therethrough which is sealed during refueling by an orifice sealing device, and a second bottomless section defined by sides with a second orifice defined therethrough wherein fuel vapors entrapped in said second section during refueling escape through said second orifice thereby changing the buoyancy of said first float body during refueling.

25. The control valve as in claim 24, wherein said first section of said first float body comprises a cylinder and said second section comprises a skirt section adjacent said cylinder.

26. The control valve as in claim 19, further comprising a second inlet configured to be connected in vapor communication with at least one vent opening in a fuel tank, said second inlet in vapor communication with said outlet and disposed so as not to be sealed by said second float body.

27. A refueling control valve for controlling venting of fuel vapors in a fuel system from a fuel tank to a vapor trap during refueling operations to prevent an overfill condition or saturation of the vapor trap, said control valve comprising a first inlet configured to receive fuel vapors and an outlet configured to direct fuel vapors to a vapor trap, said control valve comprising a variably buoyant first float body having a length so as to extend into an interior volume of a fuel tank, said first float body having a first buoyancy characteristic so as to rise over a predetermined range of movement in response to increasing fuel level in said fuel tank during refueling, said control valve further comprising a second float body physically engaged by said first float body over at least a portion of said range of movement, said first float body engaging and moving said second float body into a sealing position to seal said inlet from said outlet at a predetermined height of fuel within said fuel tank, said first float body having a buoyancy reducing mechanism for reducing its buoyancy to a second characteristic after refueling so that it lowers in said fuel tank allowing said second float body to lower and unseal said inlet, said control valve further comprising a rollover mechanism configured with said second float body to automatically move said second float body to said sealing position upon said control valve being inclined to a predetermined angle, wherein said rollover mechanism comprises a rolling weighted body resting on an inclined rolling surface generally below said second float body, said rolling weighted body automatically moving said second float body to said sealing position by gravity at said predetermined angle, said inclined surface having an angle which dictates said predetermined angle at which said rollover device actuates.

28. The control valve as in claim 27, further comprising a cage structure generally surrounding said second float body, said rollover mechanism disposed within said cage structure.

29. A refueling control valve for controlling venting of fuel vapors in a fuel system from a fuel tank to a vapor trap during refueling operations to prevent an overfill condition or saturation of the vapor trap, said control valve comprising a first inlet configured to receive fuel vapors and an outlet configured to direct fuel vapors to a vapor trap, said control valve comprising a variably buoyant first float body having a length so as to extend into an interior volume of a fuel tank, said first float body having a first buoyancy characteristic so as to rise over a predetermined range of movement in response to increasing fuel level in said fuel tank during refueling, said control valve further comprising a second float body physically engaged by said first float body over at least a portion of said range of movement, said first float body engaging and moving said second float body into a sealing position to seal said inlet from said outlet at a predetermined height of fuel within said fuel tank, said first float body having a buoyancy reducing mechanism for reducing its buoyancy to a second characteristic after refueling so that it lowers in said fuel tank allowing said second float body to lower and unseal said inlet, said control valve further comprising a second inlet configured to be connected in vapor communication with at least one vent opening in a fuel tank, said second inlet in vapor communication with said outlet and disposed so as not to be sealed by said second float body, said control valve further comprising an isolation device for automatically isolating said second inlet from said outlet at a desired point in time during refueling.

30. The control valve as in claim 29, wherein said isolation device comprises a magnetically actuated flapper device configured within said control valve to move to a position to seal said second inlet automatically upon commencing refueling.

31. The system as in claim 30, wherein said flapper device comprises a movable magnet which pulls a metallic body carried by said flapper device, said movable magnet moved automatically by an actuation device upon commencing refueling.

32. The system as in claim 29, wherein said isolation device comprises an automatic closing valve device disposed operably upstream from said second inlet to isolate said second inlet from said additional vapor openings at a desired fuel level within a fuel tank.

33. A vapor recovery fuel system, comprising:
a fuel tank having at least one vent opening defined therein;
a fuel vapor trap in communication with said vent opening to receive fuel vapors from said fuel tank; and
a refueling control valve configured with said vent opening, said control valve having a first inlet and an outlet in communication with said vapor trap, said control valve comprising a variably buoyant first float body extending into an interior volume of said fuel tank which rises over a predetermined range of movement in response to increasing fuel level in said fuel tank during refueling, said control valve further comprising a second float body engaged by said first float body over at least a portion of said range of movement, said first float body having a buoyancy during refueling so as to rise with increasing fuel level and engage and move said second float body into a sealing position to seal said inlet from said outlet at a predetermined height of fuel within said fuel tank, said first float body having a buoyancy reducing mechanism for automatically reducing its buoyancy after refueling so that it lowers in said fuel tank allowing said second float body to lower and unseal said inlet after refueling, said second float body having a sealing mechanism for sealing said inlet and a bleed valve mechanism including a needle valve assembly configured to bleed vapor pressure through said sealing mechanism in an over pressure condition in said fuel tank thereby allowing said second float body to fall from said sealing position.

34. A refueling control valve for controlling venting of fuel vapors in a fuel system from a fuel tank to a vapor trap during refueling operations to prevent an overfill condition or saturation of the vapor trap, said control valve comprising a first inlet configured to receive fuel vapors and an outlet configured to direct fuel vapors to a vapor trap, said control valve comprising a variably buoyant first float body having a length so as to extend into an interior volume of a fuel tank, said first float body having a first buoyancy characteristic so as to rise over a predetermined range of movement in response to increasing fuel level in said fuel tank during refueling, said control valve further comprising a second float body physically engaged by said first float body over at least a portion of said range of movement, said first float body engaging and moving said second float body into a sealing position to seal said inlet from said outlet at a predetermined height of fuel within said fuel tank, said first float body having a buoyancy reducing mechanism for reducing its buoyancy to a second characteristic after refueling so that it lowers in said fuel tank allowing said second float body to lower and unseal said inlet, said second float body having a sealing mechanism for sealing said inlet and a bleed valve mechanism including a needle valve assembly configured to bleed vapor pressure through said sealing mechanism in an over pressure condition in said fuel tank thereby allowing said second float body to fall from said sealing position.

35. A vapor recovery fuel system, comprising:
a fuel tank having at least one vent opening defined therein;
a fuel vapor trap in communication with said vent opening to receive fuel vapors from said fuel tank; and a magnetically controlled refueling valve configured with said vent opening, said refueling valve having an inlet in communication with said vent opening and an outlet in communication with said vapor trap, said refueling valve further comprising a magnetically controlled sealing device configured to automatically seal said inlet from said outlet during non-refueling operations and to automatically unseal said inlet from said outlet during refueling, said refueling valve further comprising a variably buoyant first float body extending into an interior volume of said fuel tank which rises over a predetermined range of movement in response to increasing fuel level in said fuel tank during refueling, said control valve further comprising a second float body movable relative to said first float body and engaged by said first float body over at least a portion of said range of movement, said first float body having a buoyancy during refueling so as to rise with increasing fuel level and engage and move said second float body into a sealing position to seal said inlet from said outlet at a predetermined height of fuel within said fuel tank, said first float body having a buoyancy reducing mechanism for automatically reducing its buoyancy after refueling so that it lowers in said fuel tank allowing said second buoyant float body to lower and unseal said inlet after refueling.

36. The system as in claim 35, wherein said refueling valve further comprises a rollover device configured to automatically seal said inlet from said outlet upon said refueling valve being inclined to a predetermined angle.

37. The system as in claim 35, wherein said first float body comprises a sinking float body which fills at least partially with fuel after refueling so as to change buoyancy and automatically unseal said inlet after refueling.

* * * * *